(12) United States Patent
Baecker et al.

(10) Patent No.: US 7,412,901 B2
(45) Date of Patent: Aug. 19, 2008

(54) MAGNETIC-INDUCTIVE FLOW METER WITH A GROUNDING DISK

(75) Inventors: Ralf Baecker, Bovenden (DE); Dieter Keese, Wahlsburg (DE); Karl-Heinz Rackebrandt, Adelebsen (DE)

(73) Assignee: ABB Patent GmbH, Ladenburg (DE)

( * ) Notice: Subject to any disclaimer, the term of this patent is extended or adjusted under 35 U.S.C. 154(b) by 84 days.

(21) Appl. No.: 11/522,709

(22) Filed: Sep. 18, 2006

(65) Prior Publication Data

US 2007/0163360 A1 Jul. 19, 2007

(30) Foreign Application Priority Data

Sep. 19, 2005 (DE) ........................ 10 2005 044 677

(51) Int. Cl.
*G01F 1/58* (2006.01)

(52) U.S. Cl. .................................................. 73/861.12

(58) Field of Classification Search ............... 72/861.12
See application file for complete search history.

(56) References Cited

U.S. PATENT DOCUMENTS

| | | | | |
|---|---|---|---|---|
| 3,286,522 A | * | 11/1966 | Cushing | 73/861.11 |
| 3,981,190 A | * | 9/1976 | Vidmantas | 73/861.12 |
| 4,734,611 A | * | 3/1988 | Granz | 310/324 |
| 4,944,182 A | * | 7/1990 | Gneiss et al. | 73/204.26 |
| 5,487,782 A | * | 1/1996 | Seewaldt | 118/621 |
| 5,526,698 A | * | 6/1996 | Sakurai et al. | 73/861.12 |
| 5,551,306 A | * | 9/1996 | Scarpa | 73/861.16 |
| 5,632,632 A | * | 5/1997 | Huotari | 439/100 |
| 5,866,823 A | * | 2/1999 | Scarpa | 73/861.16 |
| 6,530,757 B1 | * | 3/2003 | Soyer et al. | 417/423.14 |
| 6,988,311 B2 | * | 1/2006 | Otto et al. | 29/825 |

* cited by examiner

*Primary Examiner*—Harshad Patel
(74) *Attorney, Agent, or Firm*—Paul R. Katterle

(57) ABSTRACT

A magnetic-inductive flow meter with a measuring tube (1) made of metal, which is flowed through by a medium (4) which has a minimum electrical conductivity and is permeated by a magnetic field generated by means of an arrangement of magnets (5), in the region of which field at least two measuring electrodes (6) arranged diametrically on the measuring tube (1) are provided for sensing the inductively generated measuring voltage, the metal measuring tube (1) being provided with an electrically insulating inner layer (7) and an electrically conductive grounding disk (8) being arranged at the end face for grounding the medium flowing through the measuring tube (1), which disk is connected to ground via the measuring tube, the grounding disk (8') consisting of an electrically conductive plastic which comes to lie in sealing contact directly against the end face (2) of the measuring tube (1) in order to be connected to ground by the direct contact.

10 Claims, 1 Drawing Sheet

MAGNETIC-INDUCTIVE FLOW METER WITH A GROUNDING DISK

CROSS REFERENCE TO RELATED APPLICATION

This application claims priority from German Application DE 10 2005 044 677.9 filed on Sep. 19, 2005 the contents of which are relied upon and incorporated herein by reference in their entirety, and the benefit of priority under 35 U.S.C. 119 is hereby claimed.

BACKGROUND OF THE INVENTION

The invention relates to a magnetic-inductive flow meter with a measuring tube made of metal, which is flowed through by a medium which has a minimum electrical conductivity and is permeated by a magnetic field generated by means of an arrangement of magnets, in the region of which field at least two measuring electrodes arranged diametrically on the measuring tube are provided for sensing the inductively generated measuring voltage, the metal measuring tube being provided with an electrically insulating inner layer and an electrically conductive grounding disk being arranged at the end face for grounding the medium flowing through the measuring tube, which disk is connected to ground via the measuring tube.

The area of use of such a magnetic-inductive flow meter extends to the determination of volumetric or mass flows of a flowable medium, such as liquids, slurries, pastes and the like. The flowable medium must in this case have a specific minimum electrical conductivity in order for the measuring method to work. Flow meters of the type of interest here are distinguished by quite accurate measuring results, without any pressure loss being caused in the pipeline system by the measurement.

Furthermore, magnetic-inductive flow meters do not have any movable components or components protruding into the measuring tube, which are particularly liable to wear. The flow meters of interest here are used primarily in the chemical industry, pharmaceuticals and the cosmetics industry as well as communal water and waste-water management and the food industry.

Faraday's law of induction forms the basis for the measuring method. This natural law states that a voltage is induced in a conductor moving in a magnetic field. When this natural law is exploited in measuring technology, the electrically conductive medium flows through a measuring tube in which a magnetic field is generated perpendicularly in relation to the direction of flow. The voltage induced in the medium as a result is picked up by an arrangement of electrodes. Usually two measuring electrodes inserted opposite each other in the measuring tube are used as the arrangement of electrodes. Since the measuring voltage obtained in this way is proportional to the average flow rate of the flowing medium, the volumetric flow of the medium can be determined from this. Taking the density of the flowing medium into account, its mass flow can be ascertained.

It is generally known that the measuring tube of a magnetic-inductive flow meter can be produced completely from plastic. Since the plastics used are electrical insulators, no separate electrical insulating measures have to be taken for the arrangement of the measuring electrodes in the wall of the measuring tube and the like. However, measuring tubes of plastic are generally only pressure-resistant to a limited extent.

DE 102 60 561 A1 discloses a flow meter which has a measuring tube made of metal, with the result that the problems indicated above do not exist in the case of this construction. Since, however, a metal measuring tube is electrically conductive, local insulating measures are required. For example, the measuring electrodes are inserted over an insulating layer with respect to the measuring tube. In particular, the inner surface of the measuring tube is lined or coated with an electrically nonconductive material. Polytetrafluoroethylene (PTFE) is suitable for this for example. The electrically insulating lining of the metal measuring tube is required in order for the measuring principle, which is based on an induction of voltage into the flowing medium, to work. The electrically insulating inner layer of a metal measuring tube may be produced in various ways. On the one hand, it is known to draw a plastic tube—known as a liner—into the metal measuring tube and fixed it there with respect to the measuring tube. On the other hand, an electrically insulating plastic may be sprayed onto the inner surface of the metal measuring tube. After curing, the electrically insulating inner layer is obtained.

For the measuring principle used here to work, it is additionally also required to ground the medium which flows through the measuring tube. Additional grounding means which are connected to ground via the in any case grounded metal measuring tube and transfer the ground potential to the medium flowing through are customary here for ground potential application. For this purpose, additional grounding electrodes may be used, inserted just like the measuring electrodes into the wall of the metal measuring tube. However, this is quite laborious in production engineering terms. Therefore, a grounding disk is usually used for the purpose of ground potential application of the medium flowing through. The grounding disk is annular and is flowed through by the medium. The grounding disk is arranged on the side of the flange of a measuring tube that is on the inlet side, alongside a sealing ring sealing the flange of the measuring tube with respect to the grounding disk. The grounding disk placed in this way is connected to the grounded metal tube via a grounding cable. The connection is formed by means of a soldered and/or screwed connection. This has the result that there is the risk of the exposed grounding cable being torn away. In addition, the fitting and electrical connection of the conventional grounding disk is quite laborious.

SUMMARY OF THE INVENTION

It is therefore the object of the present invention to provide a magnetic-inductive flow meter which makes it possible for the medium flowing through to be connected to ground potential with few individual components in a simple way in production engineering terms.

The invention includes the technical teaching that the grounding disk consists of an electrically conductive plastic which comes to lie in sealing contact directly against the end face of the measuring tube in order to be connected to ground by the direct contact.

The advantage of the solution according to the invention is in particular that additional measures are no longer required for the electrical ground potential connection of the grounding disk. The grounding disk performs a dual function, in that it acts both as a seal in the flange region of the measuring tube with respect to the pipeline connected there and also performs the function of the ground potential connection for the medium flowing through as a result of the direct contact thereby produced and on account of its electrical conductivity. This dispenses with otherwise customary electrical contacting of the grounding disk with ground potential by means of a grounding cable, since the electrical connection with respect to the measuring tube is ensured by the direct contact. As a result of this, a functional integration is achieved by the solution according to the invention.

The grounding disk according to the invention may be formed in various ways. On the one hand, it is possible for the grounding disk to be formed in one piece on the electrically insulating inner layer. Since the grounding disk also consists of plastic, it is possible for it to be molded onto the coating material for the inner lining of the measuring tube during or after this material is injected. Since the grounding disk must consist of a different material because of its electrically conductive properties in comparison with the inner coating, a two-component injection-molding process must be used for this purpose.

In addition, it is also conceivable for the grounding disk to be formed as a separate component which, in the installed position, comes to lie with a sealing effect against the end face of the electrically insulating inner layer. This avoids the flowing medium that passes through the measuring tube penetrating into the gap region between the grounding disk and the inner lining to cause corrosion there.

According to a measure improving the above embodiment, it is proposed that the separate grounding disk is provided in the contact region with respect to the inner layer with an offset, which interacts with a corresponding offset or a recess on the inner layer in order to ensure a positive connection between the two components. This positive connection facilitates coaxial centering during the fitting of the grounding disk on the assigned flange of the measuring tube and the optimum relative position is thereby ensured in a simple way.

As an alternative to this, however, it is also possible to fasten the grounding disk undetachably to the end face of the electrically insulating inner layer or in the contact region with respect to the measuring tube by adhesive bonding or welding. Since this measure can be performed at the same time as the magnetic-inductive flow meter is being produced, fitting of the grounding disk at the place where the meter is to be used is avoided entirely. As a result, it is ensured that the grounding disk can neither be incorrectly fitted nor entirely forgotten when the magnetic-inductive flow meter according to the invention is installed.

The plastic of the grounding disk is preferably intended to have a hardness in the range of that of rubber in order optimally to ensure its secondary function as a seal. The degree of hardness of the rubber, elastomer or plastic used should preferably be 10-90 SHORE A.

The solution according to the invention is suitable for magnetic-inductive flow meters both in the version with a sprayed-on electrical insulating inner layer and in the version with an insert tube made of plastic. The only prerequisite is that the measuring tube itself is made of metal, that is to say consists of an electrically conductive material, and itself is also grounded. The electrically conductive, metal measuring tube should preferably consist of a steel alloy, which is particularly pressure-resistant as a property of this material.

BRIEF DESCRIPTION OF THE DRAWINGS

Further measures improving the invention are described in more detail below, together with the description of a preferred exemplary embodiment of the invention on the basis of the figures, in which.

DETAILED DESCRIPTION OF ILLUSTRATIVE EMBODIMENTS

Figure 1:
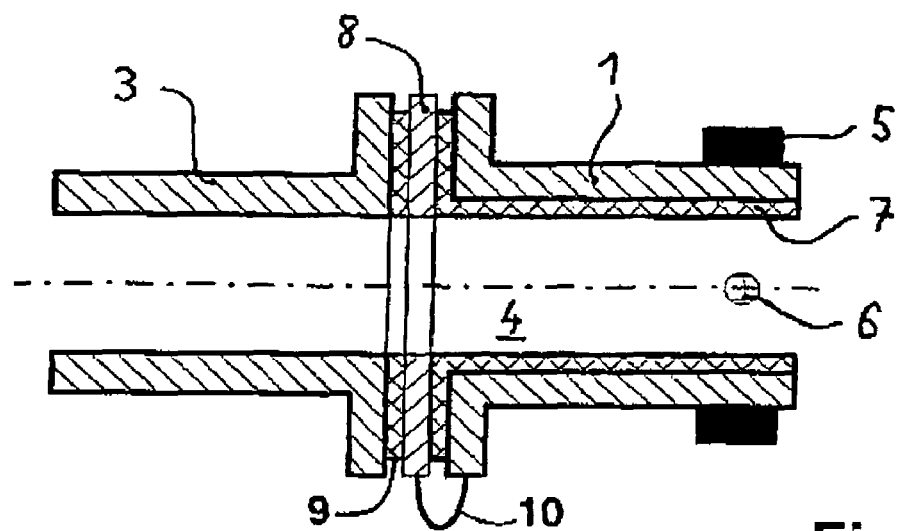
FIG. 1 shows a partial section of a measuring tube of a magnetic-inductive flow meter in the region of the flange, according to the prior art.

According to the prior art as shown in FIG. 1, the measuring tube 1 made of steel, represented in the form of a detail, has a connection flange on its end face 2. By means of the connection flange, the measuring tube is inserted into a pipeline 3—here likewise only represented as a detail—to be precise by means of a screw connection. Via the pipeline 3, the measuring tube 1 is flowed through by a medium 4, which has a minimum electrical conductivity, in order that the magnetic-inductive flow measuring principle that is the subject of the patent works. The interior of the measuring tube 1 is permeated by a magnetic field, which is generated by means of an arrangement of magnets 5 attached to the outside of the measuring tube 1. In the region of the magnetic field, two diametrically arranged measuring electrodes 6, likewise on the measuring tube 1—only one of which is shown here because of the sectional representation—are provided for sensing the inductively generated measuring voltage. The metal measuring tube is sprayed with an electrically insulating inner layer 7 of plastic. In the region of the end face 2, the inner layer 7 extends radially outward, in order at the same time to serve as a seal between the measuring tube 1 and a grounding disk 8 fitted such that it lies against it. The grounding disk 8 serves for the ground potential connection of the medium flowing through the measuring tube 1. On the side facing the pipeline 3, a further seal 9 is required. The grounding disk 8 consists of metal and is to this extent electrically conductive. Fastened radially outside the grounding disk 8 is a grounding cable 10, which at the other end is in electrical contact with the metal measuring tube 1. The metal grounding disk 8 is connected to ground via the measuring tube 1 by means of grounding cable 10.

Figure 2:
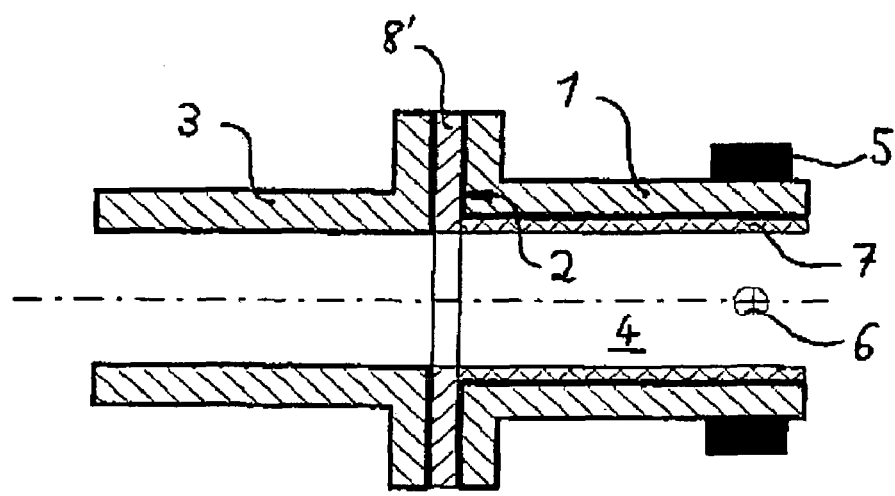
FIG. 2 shows a partial section of a measuring tube of a magnetic-inductive flow meter in the region of the flange, according to the solution provided by the invention.

According to FIG. 2, the solution provided by the invention differs from the prior art described above in that the grounding disk 8' consists of an electrically conductive plastic. An elastomer material with incorporated carbon fibers may serve for this purpose. The grounding disk 8' according to the invention comes directly into contact with the end face 2, i.e. in the region of the flange of the measuring tube 1, in order to be connected to ground by the direct contact. This is so because the metal measuring tube 1 is connected to ground. In the case of this exemplary embodiment, the grounding disk 8' is formed as a separate component, which, in the installed position, comes to lie in sealing contact against the end face of the electric insulating inner layer 7.

The invention is not restricted to the preferred exemplary embodiment described above. Rather, modifications that are covered by the scope of protection of the claims which follow are also conceivable. For example, it is also possible to form the grounding disk in one piece on the electrically insulating inner layer. If a separate grounding disk is used, it may be positionally determined with respect to the measuring tube by means of a positive connection in the form of a centering attachment, which makes it easier to fit.

What is claimed is:

1. A magnetic-inductive flow meter comprising:
   a measuring tube (1) made of metal through which flows a medium (4) which has a minimum electrical conductivity, the measuring tube (1) having an end face;
   an arrangement of magnets (5) for generating a magnetic field that permeates the medium (4);

at least two measuring electrodes (6) arranged diametrically on the measuring tube (1) for sensing the inductively generated measuring voltage;

an electrically insulating inner layer (7) disposed inside the measuring tube (1); and an electrically conductive grounding disk (8) being arranged at the end face of the measuring tube (1) for grounding the medium flowing through the measuring tube (1), which disk is connected to ground via the measuring tube, wherein the grounding disk (8') consists of an electrically conductive elastomer and wherein the grounding disk (8') engages the end face (2) of the measuring tube (1) so as to form a seal therewith and so as to be connected to ground.

2. The magnetic-inductive flow meter as claimed in claim 1, wherein the grounding disk (8') is formed in one piece with the electrically insulating inner layer (7).

3. The magnetic-inductive flow meter as claimed in claim 1, wherein the grounding disk (8') is formed as a component separate from the electrically insulating layer (7) and wherein the grounding disk (8') sealingly engages an end face of the electrically insulating inner layer (7).

4. The magnetic-inductive flow meter as claimed in claim 3, wherein the grounding disk (8') is fastened to the end face of the electrically insulating inner layer (7) by adhesive bonding or welding.

5. The magnetic-inductive flow meter as claimed in claim 3, wherein the grounding disk (8') has an offset, which interacts with a corresponding offset in the inner layer (7) in order to form a positive connection between the grounding disk (8') and the inner layer (7) for centering purposes.

6. The magnetic-inductive flow meter as claimed in claim 1, wherein the grounding disk (8') has a hardness in the range of that of rubber in order to ensure optimal elastic sealing properties.

7. The magnetic-inductive flow meter as claimed in claim 1, wherein the electrically insulating inner layer (7) comprises a coating of a plastic sprayed onto an inner surface of the measuring tube (1).

8. The magnetic-inductive flow meter as claimed in claim 1, wherein the electrically insulating inner layer (7) comprises an insert tube made of plastic.

9. The magnetic-inductive flow meter as claimed in claim 1, wherein the end face (2) of the measuring tube (1) against which the grounding disk (8') comes into contact is in the form of a connection flange which is fastened onto a corresponding connection flange on a pipeline (3) by a screw connection.

10. The magnetic-inductive flow meter as claimed in claim 1, wherein the electrically conductive, metal measuring tube (1) is produced from a steel alloy.

* * * * *